(12) United States Patent
Reitnour (10) Patent No.: US 8,862,092 B2
(45) Date of Patent: *Oct. 14, 2014

(54) EMERGENCY NOTIFICATION SYSTEM FOR MOBILE DEVICES

(75) Inventor: Philip Reitnour, Malvern, PA (US)

(73) Assignee: EmergenSee, Inc., Malvern, PA (US)

( * ) Notice: Subject to any disclaimer, the term of this patent is extended or adjusted under 35 U.S.C. 154(b) by 314 days.

This patent is subject to a terminal disclaimer.

(21) Appl. No.: 13/004,705

(22) Filed: Jan. 11, 2011

(65) Prior Publication Data

US 2011/0319051 A1    Dec. 29, 2011

Related U.S. Application Data

(66) Substitute for application No. 61/350,762, filed on Jun. 25, 2010.

(51) Int. Cl.
| | |
|---|---|
| H04M 11/04 | (2006.01) |
| H04M 1/725 | (2006.01) |
| H04W 4/22 | (2009.01) |
| H04L 29/08 | (2006.01) |
| H04W 4/18 | (2009.01) |
| G01S 19/17 | (2010.01) |
| H04W 4/02 | (2009.01) |
| H04L 12/58 | (2006.01) |
| H04W 76/00 | (2009.01) |

(52) U.S. Cl.
CPC ............ H04W 4/22 (2013.01); *H04M 2250/10* (2013.01); *H04M 2250/52* (2013.01); *H04W 4/027* (2013.01); H04M 1/72541 (2013.01); H04L 67/28 (2013.01); H04W 4/185 (2013.01); *H04W 4/026* (2013.01); *H04L 12/5865* (2013.01); G01S 19/17 (2013.01); *H04W 76/007* (2013.01); *H04W 4/02* (2013.01)
USPC .................. 455/404.2; 455/404.1; 455/456.1; 455/457; 455/456.2; 455/456.4; 455/456.6

(58) Field of Classification Search
USPC ............. 455/404.1, 404.2, 456.1–457, 550.1, 455/556.1, 556.2, 557, 563–569.2, 574; 340/539.13, 988–996; D10/104.2
See application file for complete search history.

(56) References Cited

U.S. PATENT DOCUMENTS

| | | | |
|---|---|---|---|
| 6,340,928 B1 | 1/2002 | McCurdy | |
| 6,509,830 B1 * | 1/2003 | Elliott | ...................... 340/286.02 |

(Continued)

FOREIGN PATENT DOCUMENTS

| | | |
|---|---|---|
| JP | 2001-250183 | 9/2001 |
| JP | 4403640 | 11/2009 |

(Continued)

OTHER PUBLICATIONS

International Search Report and Written Opinion, dated Jan. 5, 2012, 8 pages.

(Continued)

*Primary Examiner* — Ronald Eisner
(74) *Attorney, Agent, or Firm* — Baker & Hostetler LLP (57) ABSTRACT

An emergency notification system for a mobile device. The system includes a mobile device application that is adapted to be stored in memory on the mobile device. The application, upon activation during an emergency, determines the GPS coordinates of the mobile device, records digital images over a period of time, sends a preset message from the mobile device to at least one recipient, preferably a emergency responder, and sends the GPS coordinates and the digital images. The coordinates and images may be sent to a remote server for storage and which can be accessed by the emergency provider. The coordinates and images are periodically updated and sent while the program is activated. The application can be hidden during operation.

15 Claims, 2 Drawing Sheets

(56) References Cited

U.S. PATENT DOCUMENTS

| | | | |
|---|---|---|---|
| 7,224,956 | B1 | 5/2007 | O'Neil |
| 7,251,470 | B2 | 7/2007 | Faucher et al. |
| 7,289,786 | B2 | 10/2007 | Krasner |
| 7,349,705 | B1* | 3/2008 | Holland .................... 455/456.1 |
| 7,574,195 | B2 | 8/2009 | Krasner et al. |
| 8,045,532 | B2* | 10/2011 | Thomson et al. ............ 370/338 |
| 8,045,954 | B2* | 10/2011 | Barbeau et al. ............ 455/404.1 |
| 8,264,345 | B2* | 9/2012 | Baron et al. ................ 340/539.3 |
| 2004/0152441 | A1* | 8/2004 | Wong ......................... 455/404.1 |
| 2004/0203622 | A1* | 10/2004 | Esque et al. ............... 455/412.1 |
| 2005/0064887 | A1* | 3/2005 | Bengtsson et al. ............ 455/466 |
| 2006/0033615 | A1 | 2/2006 | Nou |
| 2006/0068753 | A1 | 3/2006 | Karpen et al. |
| 2007/0087726 | A1* | 4/2007 | McGary et al. ............ 455/404.1 |
| 2007/0136678 | A1* | 6/2007 | Brown et al. ................. 715/771 |
| 2008/0188198 | A1 | 8/2008 | Patel et al. |
| 2008/0227429 | A1* | 9/2008 | Hodgson et al. ........... 455/404.2 |
| 2009/0037989 | A1* | 2/2009 | Ruggiero et al. ................. 726/6 |
| 2009/0100144 | A1* | 4/2009 | Sullivan et al. ............... 709/217 |
| 2009/0197567 | A1 | 8/2009 | Ogram |
| 2009/0286504 | A1 | 11/2009 | Krasner et al. |
| 2010/0003945 | A1 | 1/2010 | Primo et al. |
| 2010/0003954 | A1 | 1/2010 | Greene et al. |
| 2010/0003958 | A1* | 1/2010 | Ray et al. ................... 455/404.2 |
| 2010/0046721 | A1 | 2/2010 | Geldenbott et al. |
| 2011/0151829 | A1* | 6/2011 | Velusamy et al. ......... 455/404.2 |

FOREIGN PATENT DOCUMENTS

| | | |
|---|---|---|
| KR | 10-2005-0103349 | 10/2005 |
| KR | 10-0832124 | 5/2008 |

OTHER PUBLICATIONS

Ripcord Personal Security; App Store, Lifestyle, AquilaCom, 1 page, Jul. 29, 2010.

Mobile Personal Security System; App Store, Lifestyle, Wizag LLC, 1 page, Mar. 11, 2010.

RU OK; App Store, Lifestyle, RU OK Personal Security, 1 page, Aug. 30, 2010.

EMailUrgency; App Store, Healthcare & Fitness, UbikiWare; 1 page Dec. 18, 2009.

Emergency Alarm; App Store, Utilities, Gadget Factory, 1 page, Dec. 17, 2009.

Emergency Distress Beacon; App Store, Navigation, Cinn Dev, 1 page, Aug. 25, 2008.

Emergency Location; App Store, Medical, Mark Locker, 1 page, Mar. 8, 2010.

ICodeRed SOS Emergency; App Store, Healthcare & Fitness, BAK2u Pte Ltd., 1 page, Nov. 27, 2008.

iHelp: App Store, Utilities, Echo (Arts), 1 page, May 30, 2009.

I'm Being Assaulted; App Store, Utilities, Adam Eisenman, 1 page, Feb. 24, 2010.

LifeButton; App Store, Navigation, antilia.biz 2 pages, Nov. 11, 2009.

Panic Button Emergency Locator; App Store, Utilities, Saritasa, 1 page, Dec. 23, 2009.

Silent Bodyguard—Your Personal Panic Button; App Store, Utilities, Fun At Work, 2 pages, May 10, 2010.

MyLocation—I am here; App Store, Navigation, MacMedia, 1 page, Oct. 12, 2010.

i am Safe; Global Personal Security—24/7; http://iamsafe-mobile.com, 1 page, at least Dec. 2009.

JTrek, Personal Security Surveillance with Smartphones, Walk the Safest Mobile Application Safe! 3 pages, JTrek LLC, at least Dec. 2010.

JTrek—Deter Crime, Personal Security Surveillance for Smartphones, http://www.jtrek.com, p. 1, at least Dec. 2010.

JTrek—Features and Benefits—24/7 Surveillance Protection Device, http://www.jtrek.com/featuresBenefitsPage.php, 1 page, at least Dec. 2010.

JTrek—Product Overview—Using Smartphone Video/Cameral Technology as a Personal S, http://www.jtrek.com/products.php, 1 page, at least Dec. 2010.

JTrek—Five Powerful Reasons Why You Must Own JTrek, http://www.jtrek.com/fiveReasonsPage.php, 1 page, at least Dec. 2010.

JTrek—Safety on Campus, http://www.jtrek.com/safetyOnCampusPage.php, 1 page, at least Dec. 2010.

* cited by examiner

EMERGENCY NOTIFICATION SYSTEM FOR MOBILE DEVICES

RELATED APPLICATION

This application is related to and claim priority from U.S. Provisional Application 61/350,762, filed Jun. 25, 2010, the disclosure of which is incorporated herein by reference in its entirety.

FIELD OF THE INVENTION

The present invention relates to a program for providing emergency notification and/or capturing and transmitting pertinent information from a mobile device.

BACKGROUND

A person's safety is almost always one of their top priorities. Unfortunately, when a person is kidnapped or robbed, the details related to the incident and the activities that occur immediately afterward, including the location, time, sounds, and events, are generally the most important, but hardest to determine.

There have been studies that show that the first few hours after a kidnapping are the most critical since the individuals involved are generally still in the area. As the crime "ages", it radius of interest increases and some of the critical evidence becomes lost.

Currently many individuals carry smart phones, PDAs and similar mobile devices that are capable of transmitting information. The inventor has developed a system that utilizes a mobile device to assist in capturing and transmitting critical information from the victim to persons who can provide the best chances of help.

There have been applications for providing emergency information that have been developed for use with wireless devices, such as the system described in US Patent Publication No. 2009/0286504, which is incorporated herein by reference in its entirety. However the present invention provides distinct advantages over such prior systems.

SUMMARY OF THE INVENTION

The present invention is directed to an emergency notification system for a mobile device. The system preferably includes an application operable on the mobile device which, upon activation, such as an emergency situation, causes the system to determine a set of global position system (GPS) coordinates associated with the location of a mobile device. A camera on the mobile device is activated to record digital images over a period of time. The digital images may comprise a video stream or still pictures. The set of GPS coordinates and the digital images are sent from the mobile device, preferably to a storage device, such as a remote sever. The application may also activate a microphone on the mobile device to record audio sounds from the mobile device. The audio data may be sent with the digital images.

A preset message is sent to one or more recipients indicating that the user of the mobile device is involved in an emergency situation. The recipients may include emergency responders, such as police, a monitoring service, and/or a list of emergency contacts previously entered by the user.

After a predetermined period of time, the mobile device captures another set of GPS coordinates associated with the updated location of the mobile device and records additional digital images over a period of time. The updated set of GPS coordinates and the additional digital images are sent from the mobile device, again preferably to the server. A heading and speed of the mobile device is calculated based on the sets of GPS coordinates.

If the GPS coordinates are sent to a remote server, the system preferably permits at least one remote recipient to retrieve the calculated heading and speed of the mobile device, as well as the images. This may be accomplished by including an internet link to the server in the notification message and directing the user to the server to obtain the data. Alternately, the heading and speed can be automatically sent from the server to the recipient.

The system continuously updates the GPS coordinates, images, sounds and heading until the application is deactivated.

It is contemplated that the images and coordinates may be sent with the preset message to the mobile recipients.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention that is presently preferred. However, it should be understood that this invention is not limited to the precise arrangements and instrumentalities shown in the drawings.

DETAILED DESCRIPTION OF EMBODIMENTS

Figure 1:
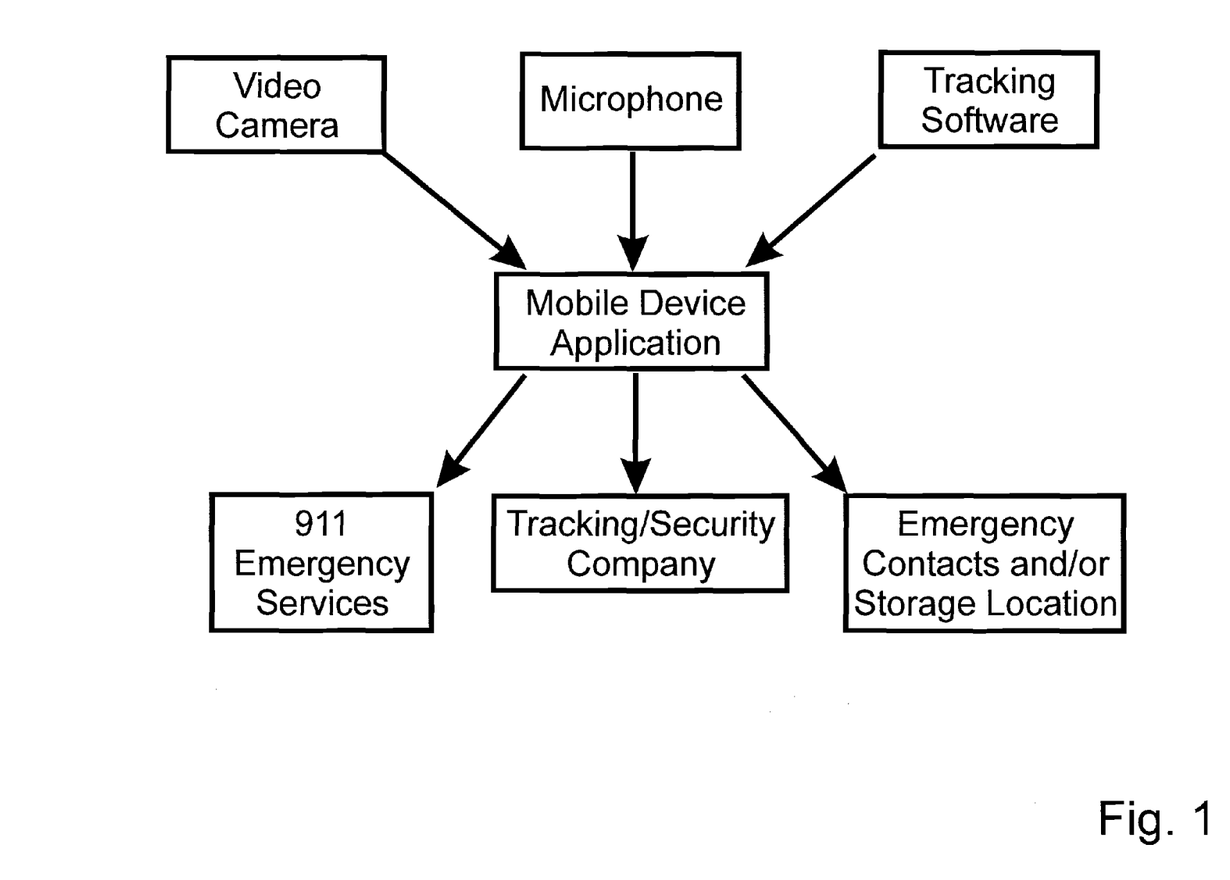
FIG. 1 schematically depicts one embodiment of the present invention.

Referring to FIG. 1, a general depiction of one embodiment of the present invention is shown. The invention is directed to an application or App 10 for a mobile wireless device 12, such as a cell phone, smartphone, laptop, netbook or other transportable device capable of transmitting information, including, for example, an Apple® iphone® smartphone or iPad® tablet, a Blackberry® or Android® smartphone, etc. In its operative configuration, the App 10 is stored and operates on the mobile device. The App may be stored in fixed or removable memory in the mobile device, such as a flashcard, memory stick or in resident memory, EPROM, RAM, ROM or other form of internal memory. While the App is described as a separate operating program, it is also contemplated that the software code could be incorporated into a larger software system, including the mobile devices' operating system.

The App may be loaded onto the device either through a wired or wireless connection, such as via a download from a remote storage location, like a server hosting a site with multiple applications, e.g., the Apple® App Store, that are downloaded by users. The App may alternatively be preinstailed in the mobile device.

The App comprises program code to provide select emergency functions when activated as described below.

The wireless mobile device 12 preferably includes a video or still camera 14, a microphone 16, a keyboard (either physical or electronically displayed on a touch screen), a position location system 18, such as a GPS receiver, that uses the wireless device's antenna to receive signals from a multiplicity of GPS satellites and process its position therefrom. The GPS satellites comprise any group of satellites that transmit GPS downlinks used for positioning by a GPS receiver. Each satellite has a computer and a clock and radio on board, and continually broadcasts its changing position and time. The GPS receiver is housed within or is coupled to the wireless mobile device and trilaterates its own position by processing the signals from downlinks from three or more satellites, resulting in a longitude and latitude position that can be very accurate. In some GPS receivers, timing information that is derived from the processing of the received GPS signals from downlinks is provided over a cellular (or other wireless link) to a remote entity which in turn computes the position of the GPS receiver. Such systems are sometimes called Assisted GPS receivers (AGPS). The position location system described could include either conventional and/or AGPS receivers, as well as other position location devices and methods. In the present invention it is contemplated that the video, microphone, and GPS components are conventional in the art and, thus no further discussion is necessary.

The wireless device 10 includes a wireless telecommunication system that is designed to transmit and receive voice and data between the wireless device 10 and wireless communication receivers, such as cellular base stations, WIFI hubs, etc. Any conventional telecommunication system can be used in the invention for communicating data and/or voice data. Although the present invention will be described primarily as providing one-way telecommunication, the invention is not limited to that and can be used with any conventional two-way communication system.

The App includes suitable hardware and/or software (hereinafter generally referred to as the App control system) that enables processing of data within the wireless mobile device, transmission of data from the device, and control over components and/or functionality, including other applications and programs stored on the device or elsewhere. For example, the App control system is connected through hardware and software to the video or still camera 14 on the mobile device for activating the camera to provide intermittent or continuous video or still photos after the user has started the App. The App control system preferably causes the device to store the video or stills in memory, either flash or fixed memory. Alternatively, or in addition to the local storage on or connected to the device, the App control system can cause the device to transmit the digital video or stills through WIFI, cellular communication or other telecommunication system to a remote storage cite, such an a web-based server, a personal computer, an emergency response center (such as an E911 center, or campus or building security) and/or a security monitoring facility, such as ADT or Brinks Security.

The App control system is also preferably capable of activating the microphone 16 to cause the device 10 to retrieve audio sounds from the microphone upon activation of the App. The retrieval may be continuous or intermittent (such as at predetermined times or when sounds are detected). The digital data representing the audio sounds may be stored locally (in a fixed or removable memory source), and/or transmitted through WIFI, cellular communication or other telecommunications system to a remote storage cite as described above. If the wireless device includes a still camera, the audio data may be transmitted along with the still photos or separate from them. If the wireless device includes a video camera, the audio data may be included as part of the video data, but could also be sent separate from it.

If the wireless device includes a position location system, such as a GPS receiver, the App control system also preferably activates the GPS system to determine the location of the wireless device and stores the data locally and/or remotely as described above through the wireless device's telecommunication system. The position location data may be transmitted intermittently (such as every 30 seconds or when a change in location above a threshold distance is determined) or continuously, thereby providing a data log of the device's changing position so as to track the movement of the phone.

The control system includes programming that preferably determines when to activate one or more of the components, and when and/or how to process the data received from those components.

In one embodiment, the control system includes a notification system that is responsive to activation of the App. When the user presses, clicks or otherwise activates the App icon (i.e., an icon or shortcut placed on the mobile devices display screen or a hardwired button on the mobile device designated to activate the App), the control system, in one embodiment, immediately sends a message through the telecommunication system (e.g., automatically dials) to one or more preset emergency numbers, such as to E911, campus security, and/or a national security monitoring service like ADT. The message may be a preset audio (or text) message, such as "This is an emergency message from phone 123-456-7890, which is owned by Mary Smith. Help is needed. The phone is transmitting from Latitude 12.345 and Longitude 98.765," Alternately, the GPS system may provide a more specific location which is inserted into the message, such as "Broad and Chestnut Streets, Philadelphia Pa."

It is also contemplated that the App may be programmed to transmit only certain information (such an audio transmission) to the police at the E911 number and inform the police that additional data, such as video data, digital sound, and/or GPS tracking information, can be obtained at a certain website or through a national or regional security service.

In order to prevent the App from inadvertently being activated, the present invention contemplates that the App control system may be programmed with a delay, thus requiring the user to either depress the icon for a predetermined time, such as 5 seconds, or to depress the icon twice within a predetermined time (e.g., within 5 seconds). Other ways of protecting against inadvertent use or notification transmission could be used in the App, such as a delay in transmission of the notification to the police thereby giving the user time to enter a deactivation code.

It is also contemplated that the App may be designed to operate in a hidden mode so as to prevent anyone that views the device other than the owner from knowing that the App has been activated. One method of doing so is for the App to maintain the standard operation of the device (e.g., the App is programmed to run in the background and maintain the default screen view.) In order to allow the owner to realize that the App is active, an inconspicuous icon can be displayed on the main device screen or the App icon can be depicted in a different color (e.g., change from red to blue). The telephonic functions of the device may remain operational or may be mimicked so that if someone other than the user checks for a dial tone, a sound will be provided. Also, certain features of the mobile device may be disabled to prevent an individual other than the owner from checking to see if the wireless device is transmitting information. For example, the phone log may not be updated to indicate that a call was made to the police.

In one variation of the invention, the App may not transmit any message to the police or other security service. Instead, the App would activate the device components (video, camera, microphone, position locator, etc.) as described above and store and/or transmit the information to a remote location, such as storage in the clouds (web storage locations), FTP sites, home computer, etc. When the owner or a third party (e.g., police, security company or relative) determines the device (or the owner) is missing, they could access the stored information. The information would provide the person accessing it with information (such as a GPS log of where the device has been transmitting from) that might assist in locating the owner or the device.

In another variation of the invention, the two way telecommunication system is used to activate the App. This embodiment of the invention is particularly useful if the device has been stolen. The owner dials an alternate number associated with the device that is tied directly into the App. Instead of ringing, the device receives the call and activates the App. The App then begins operating and transmitting as described above.

As discussed above, the App preferably includes a notification system that, in its simplest embodiment, is an auto-dialing program that allows for automatic dialing of 911 or other emergency response service number. The system may broadcast a default message (or user preprogrammed message) to the emergency response service and may send a further message to the emergency response service or a secondary person such as a relative. The message may or may not include the data from the device components. If it does not include the data, the message may direct the emergency response personnel to the location where the data can be found, such as a security company, the user's home computer or a storage location in the clouds. The message may include a security code to allow the emergency response personnel to access the information.

In one embodiment of the invention, the App includes the following features and functions. During initial startup, the App starts the GPS tagging functionality which identifies the location of the mobile device at that moment. The App also runs a profiling module to setup information on the user, such as recording the user's voice message or text message (or permitting the user to select a default message from one or more prerecorded messages, and adding contacts (either manually or by pulling data from the mobile device's contacts list.) The App also preferably prompts the user to enter a personal identification number (PIN) which is used by the App to limit access to the profile for future changes and/or to permit the user to terminate the App during an erroneous distress call.

After completion of the profile setup, the App may automatically send a notification email, SMS text, and/or voice message to the user's identified contacts (other than the emergency responders) notifying them that they have been added to the user's emergency contact list and explaining what that means. The App may provide the contact with the ability to reply accepting or rejecting the request. If the contact rejects the offer to be an emergency contact, the user is notified of the contacts decision to not be an emergency contact and the App may prompt the user to add an additional contact if there are no other emergency contacts stored in the user's profile.

If the mobile device does not include video capability (or even if it does), during activation in an emergency, in addition to recording and transmitting GPS coordinates, the mobile device preferably records and transmits to the emergency contacts either by streaming or at periodic intervals (e.g., taken at 10 second intervals) as bulk uploads of audio data and photos (if the device includes a still camera).

If the mobile device has video capability, such as the Apple® iPhone® 3GS or 4 smartphone, the App uses the video capability to capture and transmit video data in addition to GPS, audio, and may also use the photo functionality of the device.

In the event that the user activates the App to send a distress call, as described above, the App preferably includes the ability of the user to terminate the distress call (for example if the App was activated inadvertently). In this mode, the App provides a time frame, such as the first five (5) seconds after activation, for the user to either type in a cancelation code, or hit a certain key, such as the Home Button on the iPhone® smartphone, thereby automatically cancelling the distress call. During the 5 second initial delay, the App preferably still captures the data (GPS, audio, video, pictures) but does not immediately send it until the 5 second period has expired. For example, two OPS readings can be taken in the delay period and the speed and heading calculated prior to transmission. If the App is deactivated, the data is preferable erased.

After the initial 5 second delay, the App can preferably only be deactivated by the user by entering their PIN. If the user enters the proper PIN the App is terminated and the App preferably sends a message to the contacts that the distress call was a false alarm or that the user is okay. The App may include an optional function that permits the user to enter a false PIN which appears to deactivate the App, but which in actuality sends a further message that the distress call is not a false alarm. This would be beneficial in cases of abduction where the individual committing the abduction determines that the App is operating a Id forces the user to terminate it.

As discuss previously, the App can also track movement of the device, through analysis of the GPS data, and calculate the heading and speed of the device. That information can also be provided to all emergency responders to give them the ability to estimate the future location of the device, and potentially deduce whether the device (and thus the user) is in a vehicle, walking or stationary. The ability to process data to determine heading and speed is within the knowledge of those skilled in the art. The system can also determine how long the device has been at a particular location.

During a distress call, the App may be configured, through the user profile setup or depending on the App version, to cause the mobile device to:
vibrate with any Data-transmission;
distribute emails/SMS/voice messages to some or all designated recipients depending on profile;
call, email, or otherwise transmit to 911 or other emergency responder;
contact a predetermined call center (such as a company like ADT);
capture photos and/or video during preset intervals, and upload or stream the captured information; and/or
capture and transmit/distribute GPS coordinates, including latitude, longitude, speed, and/or heading.

If no Internet connection is available at the time that the App is attempting to transmit, the App preferably stores the data on the device and monitors the availability of an internet connection. Once a connection is found or cell signal is detected, the device uploads the stored data.

In one embodiment, the App operates in the following sequence upon launch:
App captures GPS, shoots video/images and retrieves audio on launch;
5 Second Delay;
App hides itself, returns user to springboard or desktop and dims screen;

App captures GPS again, heading and speed is calculated based on current reading and initial reading;

App begins uploading/streaming captured video/images/audio, preferably with information stored about the user (such as photo);

10 Second delay;

App captures GPS again, heading and speed is calculated based on current reading and last GPS reading; and App begins uploading/streaming video/images/audio.

It is preferable that the App sends a notification to the designated recipients each time the user's location changes or if accuracy of the location improves. If the GPS location of the user has not changed over a prescribed period, the App sends an email noting the GPS location (and preferably indicating that it has not changed) and may also capture and send images/video from the device. The App could be configured to compare the images and/or video and if there is no change, the App does not transmit the images/video to save battery life. The App could also be configured to analyze the audio signal and it the audio signal data is not above a threshold (representing an audible sound), the App can stop recording or not transmit the data.

Preferably the App is configured to also sent emails to the user's personal account or computer during a distress call. The App also preferably stores the distress call history.

Each distress call email preferably includes:

date & time of activation;

user photo (if stored on the device or in App: predetermined message with help request;

link to and/or image of Google® Maps, Yahoo® Maps or other digital map with user's most recent location:

most recent GPS coordinates, such as street address (as determined from the GPS coordinates if possible), latitude longitude, altitude, speed, and heading:

links to captured video (if stored on emote location on or over the internet) or video included with the message; and links to images and audio (if stored on a remote location on or over the internet) or images and audio included with the message.

Each distress call SMS text message preferably includes:

most recent GPS coordinates, such as street address (as determined from the GPS coordinates if possible), latitude, longitude, altitude, speed, and heading;

URL link to Google®Maps, Yahoo® Maps or other digital map with user's most recent GPS location shown; and brief help request message identifying the user, The App preferably periodically (e.g., yearly) sends an email/SMS/voice messages to the recipients that are identified in the profile (other than emergency responders) to insure contact information is still accurate. The message may be set to give the recipient the ability to remove their name from the emergency contact list. The App can also be configured to periodically run tests and send the user the results of the tests.

It is also contemplated that recognition software may be included as part of the App to try to recognize locations (such as street signs, unique structures or artwork) for purposes of trying to ascertain the location of the user and the device.

The iPhone® 4 smartphone and other recent smartphones have come out with dual video cameras, one on the front and one on the back to permit video chatting. It is contemplated that the App can use the cameras on both the front and rear facing cameras to provide additional information, such as capturing how the user is doing while also capturing the surrounding details, or if the App determines that the data from one camera is not useable, e.g., the device is positioned so that the main camera in facing a surface (such as a tabletop), the App can use the second camera to record data. The App can determine if the camera image is sufficient by analyzing the digital data in any well known way, such as looking at the brightness of the image.

Another optional feature of the App is the use of fingerprint scanning. There are applications on the market that can scan a user's fingerprint and store the relevant data. In one embodiment, the App uses the fingerprint scanner to store fingerprint information related to the user. The information can be stored during the initial setup. Once the App is activated, the App can only be deactivated when a fingerprint scan is taken and the App determines that there is a match between the scanned data and the stored data for the user's fingerprint. If there is no match, the App continues to operate recording data and sending it.

In a modification of the above embodiment, the App can also, upon receiving a non-matching fingerprint, send the data on that scanned fingerprint to the emergency responders. Thus, in the event the App is running and a criminal picks up the device, the App will determine that it is not the correct user and send the fingerprint to law enforcement who could then run the fingerprint through the national database to find a hit.

It is also contemplated that the App can monitor the keywords or codes used to unlock that App and, if a certain code or keyword is typed in, the App can do something other than turning itself off. For example, the user can program the App to be deactivated upon typing in "Safe", but to send a further emergency notice when the word "All Clear" is typed in. Thus, in the event that the individual that created the emergency situation finds out that the App is running and tells the user to turn it off, the user can type in the words "All Clear" and a further message may be sent to the recipients such as "This is not a test, Please help immediately!"

The following is a non-exhaustive list of potential uses for the App:

Child or children are walking home from school and a stranger approaches them in a vehicle and offers to give them a ride.

An individual on a date is being harassed by the other person.

Suspicious person following the user at night or while in a parking lot.

A suspicious vehicle approaches or follows the user.

A domestic violence event where the user is afraid to or, pick up a phone and call.

A road rage incident.

A hit and run accident.

A serious vehicle or pedestrian accident or injury where the user cannot call or speak into a phone, An assault or a threat by someone with a weapon.

A robbery occurs.

A circumstance involving abuse of authority by an official.

Violent or criminal behavior, such as a severe fight, shooting, or stabbing.

Civil disorder and demonstrations, such as flashmobs.

Psychological crisis.

Critical medical condition occurs, such as a stroke, or asthma attack.

Animal attack,

Hazardous material accident.

Weather emergencies, such as severe snow tornado, hurricane, or earthquake.

Security alerts.

Report serious incident as it is occurring,

Report an aircraft incident while it is happening.

Activate in the case of a purse snatching and allow to provide tracking as you follow the path of the perpetrator.

Activate if a police officer is in trouble.

Activate in the cases someone breaks info your home while you ere there, or while a crime is in progress.

Activate to report a serious fire or explosion, or chemical spill

Activate to report a safety risk, such as chemical spills,

Can, be activated by a security guard, such as armored trade guard, while on duty or in the case of a threat.

It is also contemplated that the system can be used as part of a campus security system for a university of college campus. In this embodiment, the first responders may be the campus security. If a student is in a critical situation, such as a mugging or kidnapping, the student can activate the App. The campus security would receive the messages and/or data as discussed above. In addition to sending security officers to the location sent from the mobile device, a corresponding application on the campus security system can be configured to automatically orient campus video/surveillance cameras to the location to assist anyone in a monitoring station to located the incident. In the event that the student is abducted by the perpetrator, the GPS tracking information, such as direction of travel, can be used by the campus security to direct the first responders or police to a specific location to cut off the perpetrator.

In another embodiment of the invention, the App can also be activated externally for providing information. In this embodiment, the App is responsive to a remote transmission, such as an email, phone call, wireless activation, etc. and could be set up to not include sending a transmission to an emergency responder such as 911. Instead, the remote transmission can be used to activate the App for purposes of tracking the mobile device and receiving video, still photos, and audio information. This can be particularly useful in several cases. If a parent wishes to track and monitor where their child is and what they are doing, they can activate the App stored on their child's mobile phone remotely and retrieve the information. It is similar to a Lojack® system, although it provides more detailed data and permits the parental monitoring of conversations. The App can also be programmed to retrieve the call history from the phone and other data including text messages.

This version of the App is also helpful in the event that the mobile device is stolen from someone during a robbery. The App can be activated and the data transmitted to law enforcement for purposes of tracking the perpetrator.

The systems described above may be configured as a computing application, a computing applet, a computing program and/or other instruction set operative on a computing system to perform the functions, operations, and/or procedures described above. An exemplary computing system is controlled in a known way primarily by computer readable instructions, which may be in the form of software, for performing the various steps, processes, and functions described above. The computer readable instructions can contain instructions for the computing system for storing and accessing the computer readable instructions themselves. Such software may be executed within one or more processing units, such as a mobile device's microprocessor, to cause the computing system to do work.

As described previously, the various techniques described herein may be implemented in hardware or software, or a combination of both. Preferably, the techniques are implemented in computing environments using programmable computers that include a processor, a storage medium readable by the processor (including volatile and non-volatile memory and/or storage elements), at least one input device, and at least one output device. The App is preferably stored on a storage medium on or attached to the device and is readable by a general or special purpose mobile smart phone for configuring and operating the mobile device when the storage medium is read by the microprocessor to perform the procedures described above. A computer-readable storage medium, such as a flashdrive, CD-ROM, hard drive on a server (such as those associated with the iTunes® App store), etc, may be programmed to store the App, such that the App can be operated from the storage medium, or downloaded, retrieved, streamed or otherwise transferred from the storage media to the mobile device.

In another aspect of the invention, a secondary application (Second App) may be operating on the devices or systems associated with the emergency contacts, including the first responders, or may be stored at a remote location for activation by any of the recipients. The Second App may be programmed to permit the recipient, such as the emergency responders or a monitoring service to transmit the data immediately to select secondary recipients selected by the user or the recipients so that they can use the information to assist in the helping the user. For example, upon the user activating the App, the data associated with the mobile device (GPS data, video, audio, etc.) is transmitted to an emergency responder and/or a monitoring system and emergency contacts. If the Second App is activated by any of the recipients (such as the 911 operator), it permits selection of additional responders to receive the transmitted data, such as police officers on patrol in the vicinity of the incident. As such, as the 911 operator receives updated information (such as changing positional data), the secondary responder also receives the information, thus eliminating the need for the operator to relay the information. The Second App can be programmed to automatically select secondary recipients when activated based on pre-selections entered by the responder or user (such as family members to contact in the case of emergency).

Figure 2:
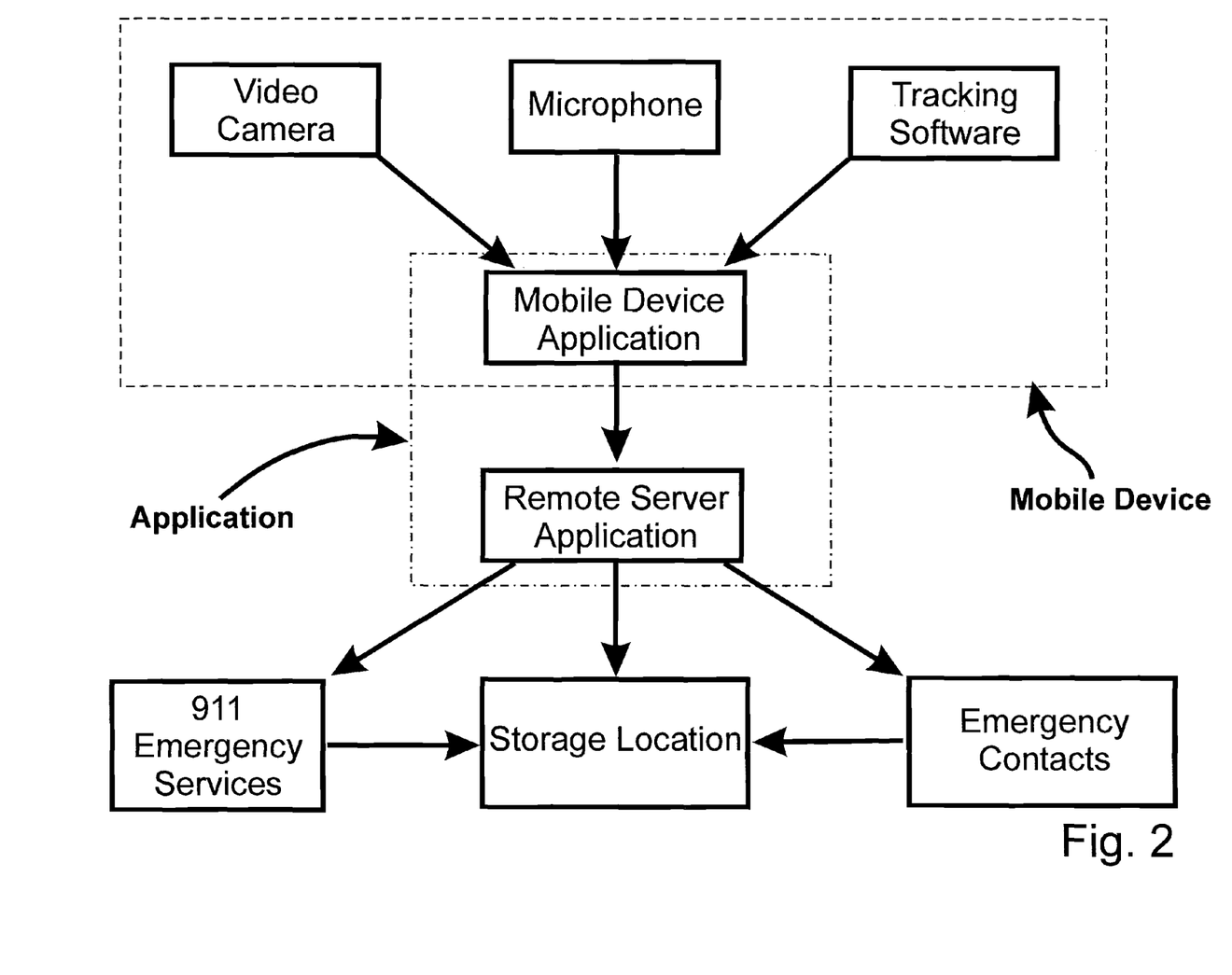
FIG. 2 schematically depicts another embodiment of the present invention.

While the present invention has been described as an application for running on a mobile device, it is also contemplated that some of the functions and actions described could be configured to occur on a separate server. As shown in FIG. 2, it is contemplated that a remote server may be part of the system such that when the App is activated on the mobile device, it communicates with the server, which then commences some of the functions described above. For example, the list of emergency contacts may be stored on the server, such that when the App is activated, data is sent to the server (GPS location coordinate, audio data, video data, etc.) The server then sends some or all of that data to the emergency contacts, including the emergency responders. This allows the mobile device to save critical battery life since some activities, such as calculating speed and direction, sending multiple messages, etc, can be conducted on the server. The server can also store records of all the information transmitted by the mobile device, as well as all the notifications that the server sends to emergency responders and emergency contacts. The information can be stored on the server or a remote storage device. It is possible to include a security system on the server, such as password protection limiting access to the stored data. When the e-mail is initially sent from the mobile device, it may include a link to the server location where the data is stored and a password or simply just transmit a secured link to the recipient.

Thus, in this embodiment, the system or application may include sub-applications, modules, or subroutines that are stored on devices other than the mobile device.

Although the embodiments described above have described the sending of the position, audio and video data by e-mail, it is also contemplated that the system could transmit a prerecorded voice message with the GPS coordinates digitally appended to the message.

In another embodiment, the App on the mobile device can be used to active one or more remote cameras for purposes of capturing visual or audio data. For example, the user may have a small portable device, such as an MP3 player, that contains a camera and/or microphone, and is WIFI, Bluetooth® 3G or 4G wireless technology enabled and is clipped or otherwise attached to their outfit, the App can be configured such that, upon activation, the mobile device searches for the remote camera/microphone and uses that camera/microphone to capture surrounding visual/audio data and send it to the mobile device, which can then store the information or transmit is as described above. This allows the mobile device to remain hidden and, thus, not alert the perpetrator that the events surrounding the user are being recorded.

In addition to mobile phones, this embodiment of the invention can be used with other mobile or portable devices, such as and iPad® tablet or laptop, or can be used with a desktop device such as a PC or iMac® computer. This embodiment of the present invention has applicability in home security systems where portable devices can be mounted at various locations throughout the house and wirelessly connected to the base computer. The base computer can retrieve information from the various wireless devices and store it on the computer or transmit it to a remote server, as described above.

The present invention may be embodied in other specific forms without departing from the spirit or essential attributes and, accordingly, reference should be made to the appended claims, rather than to the foregoing specification, as indicating the scope of the invention.

The invention claimed is:

1. A mobile device comprising a processor and a non-transitory computer readable storage medium, the non-transitory computer readable storage medium having computer executable instructions stored thereon, the computer-executable instructions defining an application executable by the processor of the mobile device, the computer-executable instructions, when executed by the processor of the mobile device, causing the mobile device to perform steps comprising:

(a) detecting a user activating the application by either (i) detecting depressing of an icon representing the application for a predetermined period of time before being released, or (ii) detecting depressing of the icon twice within a predetermined period of time;

(b) in response to detecting the user activating the application, thereafter automatically performing each of the following additional steps (c) through (k) without further user input;

(c) determining a set of global position system (GPS) coordinates associated with the location of the mobile device;

(d) activating a camera on the mobile device to record digital images over a period of time;

(e) activating a microphone of the mobile device to retrieve audio sounds from the microphone;

(f) sending a preset message from the mobile device to one or more preset emergency numbers, said preset message including at least a name of the user of the mobile device and a description of an emergency situation, wherein the preset message is set before the user activates the application during use;

(g) sending the set of GPS coordinates, the retrieved audio sounds, and the digital images from the mobile device to at least one remote recipient;

(h) after a predetermined period of time, capturing another set of GPS coordinates associated with the current location of the mobile device, retrieving additional audio sounds, and recording additional digital images over a period of time;

(i) sending the current set of GPS coordinates and the additional audio sounds and digital images from the mobile device to the at least one remote recipient;

(j) repeating the steps (h) and (i); and (k) operating in a hidden mode so as to prevent anyone that views the device other than the user from knowing that the application has been activated, said hidden mode including the application running in the background and maintaining the default screen view or darkening the screen;

and wherein the computer-executable instructions, when executed by the processor of the mobile device, further cause the mobile device to perform the steps of:

(l) deactivating the application upon detecting the user entering a correct PIN code; and (m) sending a further message that said preset message is not a false alarm upon detecting the user entering a false PIN code.

2. The mobile device of claim 1, wherein the camera is a video camera and wherein the digital images form a video.

3. The mobile device of claim 1, wherein the camera is a still camera and wherein the digital images are still photos.

4. The mobile device of claim 1, wherein the remote recipient where the GPS coordinates and the digital images are sent is a server, and wherein at least one of the one or more preset emergency numbers where the preset message is sent is the emergency number of an emergency responder.

5. The mobile device of claim 4, wherein the computer-executable instructions, when executed by the processor of the mobile device, further cause the mobile device to also send the GPS coordinates to the one or more preset emergency numbers.

6. The mobile device of claim 1, wherein the at least one remote recipient where the GPS coordinates and the digital images are sent are multiple recipients selected from a stored list.

7. The mobile device of claim 4 wherein the computer-executable instructions, when executed by the processor of the mobile device, further cause the mobile device to add to the preset message a link to the server to permit the recipient to access the stored GPS coordinates and the digital images.

8. The mobile device of claim 7 wherein the preset message is sent to multiple recipients that were previously stored and are accessible by the application.

9. The mobile device of claim 4, wherein the computer-executable instructions, when executed by the processor of the mobile device, further cause the mobile device to depict the location of the mobile device and the heading on a map, and providing a link to the map in the message that is sent.

10. An emergency notification system, the system comprising:

a mobile device comprising a processor and a non-transitory computer readable storage medium, the non-transitory computer readable storage medium having computer executable instructions stored thereon, the computer-executable instructions defining an application executable by a processor of the mobile device, the computer-executable instructions, when executed by the processor of the mobile device, causing the mobile device to perform steps comprising:

(a) detecting a user activating the application by either (i) detecting depressing of an icon representing the application for a predetermined period of time before being released, or (ii) detecting depressing of the icon twice within a predetermined period of time, (b) in response to detecting the user activating the application, thereafter automatically performing each of the following additional steps (c) through (k) without further user input;

(c) determining a set of global position system (GPS) coordinates associated with the location of the mobile device, (d) activating a camera on the mobile device to record digital images over a period of time, (e) activating a microphone of the mobile device to retrieve audio sounds from the microphone, (f) sending a preset message from the mobile device to one or more preset emergency numbers, said preset message including at least a name of the user of the mobile device and a description of an emergency situation, wherein the preset message is set before the user activates the application during an emergency, (g) sending the set of GPS coordinates, the retrieved audio signals, and the digital images from the mobile device to a remote server, (h) after a predetermined period of time, capturing another set of GPS coordinates associated with the current location of the mobile device, retrieving additional audio sounds, and recording additional digital images over a period of time, (i) sending the current set of GPS coordinates and the additional audio sounds and digital images from the mobile device to the remote server, (j) repeating the steps (h) and (i), and (k) operating in a hidden mode so as to prevent anyone that views the device other than the user from knowing that the application has been activated, said hidden mode including the application running in the background and maintaining the default screen view or darkening the screen, and wherein the computer-executable instructions, when executed by the processor of the mobile device, further cause the mobile device to perform the steps of:

(l) deactivating the application upon detecting the user entering a correct PIN code, and (m) sending a further message that said preset message is not a false alarm upon detecting the user entering a false PIN code; and a server located remote from the mobile device, the server comprising a processor and a non-transitory computer readable storage medium, the non-transitory computer readable storage medium having computer executable instructions stored thereon, the computer-executable instructions defining a server application executable by the processor of the server, the computer-executable instructions, when executed by the processor of the server, causing the server to perform steps comprising storing the sets of GPS coordinates and digital images received from the mobile device, calculating a heading and speed of the mobile device based on the sets of GPS coordinates, and sending to at least one remote recipient an internet link to the stored data on the server.

11. The system of claim 10, wherein at least one of the one or more preset emergency numbers where the preset message is sent is the emergency number of an emergency responder.

12. The system of claim 11, wherein the emergency responder is also sent the GPS coordinates.

13. The system of claim 10, wherein the executable instructions of the computer readable storage medium of the server, when executed by the processor of the server, further cause the server to perform the steps of generating a map representative a region in the vicinity of the GPS coordinates and displaying the location of the mobile device and at least the heading on the map.

14. The system of claim 11, wherein the mobile device or the server also sends the preset message to multiple recipients selected from a stored list.

15. A non-transitory computer readable storage medium having computer executable instructions stored thereon, the computer-executable instructions defining an application executable by the processor of a mobile device, the computer-executable instructions, when executed by the processor of the mobile device, causing the mobile device to perform steps comprising:

(a) detecting a user activating the application by either (i) detecting depressing of an icon representing the application for a predetermined period of time before being released, or (ii) detecting depressing of the icon twice within a predetermined period of time;

(b) in response to detecting the user activating the application, thereafter automatically performing each of the following additional steps (c) through (k) without further user input;

(c) determining a set of global position system (GPS) coordinates associated with the location of the mobile device;

(d) activating a camera on the mobile device to record digital images over a period of time;

(e) activating a microphone of the mobile device to retrieve audio sounds from the microphone;

(f) sending a preset message from the mobile device to one or more preset emergency numbers, said preset message including at least a name of the user of the mobile device and a description of an emergency situation, wherein the preset message is set before the user activates the application during use;

(g) sending the set of GPS coordinates, the retrieved audio sounds, and the digital images from the mobile device to at least one remote recipient;

(h) after a predetermined period of time, capturing another set of GPS coordinates associated with the current location of the mobile device, retrieving additional audio sounds, and recording additional digital images over a period of time;

(i) sending the current set of GPS coordinates and the additional audio sounds and digital images from the mobile device to the at least one remote recipient;

(j) repeating the steps (h) and (i); and (k) operating in a hidden mode so as to prevent anyone that views the device other than the user from knowing that the application has been activated, said hidden mode including the application running in the background and maintaining the default screen view or darkening the screen;

and wherein the computer-executable instructions, when executed by the processor of the mobile device, further cause the mobile device to perform the steps of:

(l) deactivating the application upon detecting the user entering a correct PIN code; and (m) sending a further message that said preset message is not a false alarm upon detecting the user entering a false PIN code.

* * * * *